United States Patent [19]

Humme et al.

[11] 4,399,273
[45] Aug. 16, 1983

[54] PROCESS FOR THE REMOVAL OF RESIDUAL MONOMERS FROM ABS POLYMERS

[75] Inventors: Gert Humme, Odenthal-Gloebusch; Horst Plato; Karl-Heinz Ott, both of Leverkusen; Friedrich Kowitz, Dormagen; Peter Hagenberg, Leverkusen, all of Fed. Rep. of Germany

[73] Assignee: Bayer Aktiengesellschaft, Leverkusen, Fed. Rep. of Germany

[21] Appl. No.: 276,473

[22] Filed: Jun. 23, 1981

Related U.S. Application Data

[63] Continuation of Ser. No. 127,742, Mar. 6, 1980, abandoned.

[30] Foreign Application Priority Data

Mar. 10, 1979 [DE] Fed. Rep. of Germany ....... 2909518

[51] Int. Cl.³ ............................. C08F 6/16; C08F 6/22
[52] U.S. Cl. .................................... 528/486; 528/487; 528/488; 528/490
[58] Field of Search ................ 260/29.7 PT; 528/486, 528/487, 488, 490

[56] References Cited

U.S. PATENT DOCUMENTS

| | | | |
|---|---|---|---|
| 2,362,052 | 11/1944 | Craig | 260/29.7 PT |
| 3,228,906 | 1/1966 | Schlutter et al. | 260/29.7 PT |
| 3,438,923 | 4/1969 | Strobel | 260/29.7 PT |
| 3,896,093 | 7/1975 | Valoti et al. | 528/486 |
| 4,115,477 | 9/1978 | Morris | 260/880 R |

FOREIGN PATENT DOCUMENTS

2040506  4/1970  France .
86500  1/1971  German Democratic Rep. ................... 528/488

OTHER PUBLICATIONS

Chemical Abstracts, vol. 87, No. 18, Oct. 31, 1977, 136829f.

Primary Examiner—Stanford M. Levin
Attorney, Agent, or Firm—Connolly and Hutz

[57] ABSTRACT

Process for the removal of residual monomers from ABS polymers prepared by emulsion polymerization, wherein from 0.1 to 10% by weight, based on the solids content in the latex, of an electrolyte such as an acid or a salt are added to a latex containing an ABS polymer, and the mixture is at the same time heated to a temperature of from 55° to 120° C. while the residual monomer and part of the water are removed by distillation.

1 Claim, 2 Drawing Figures

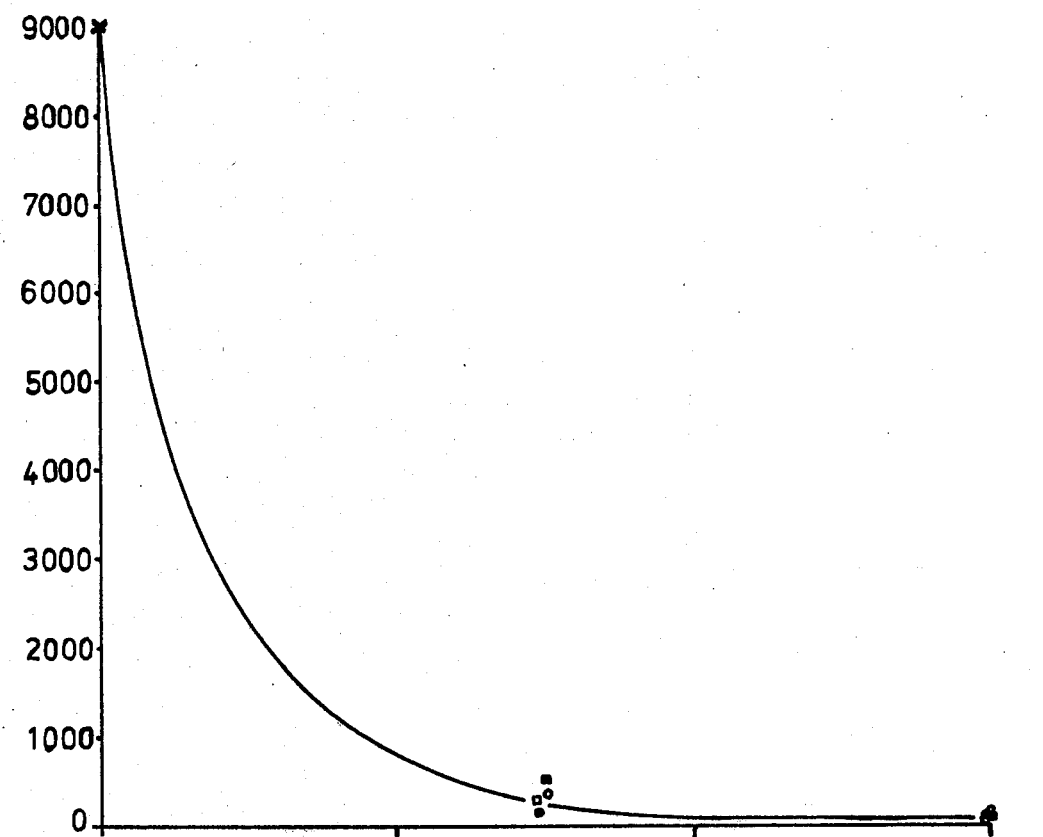
FIG. 1 — DURATION OF STEAM DISTILLATION IN HOURS
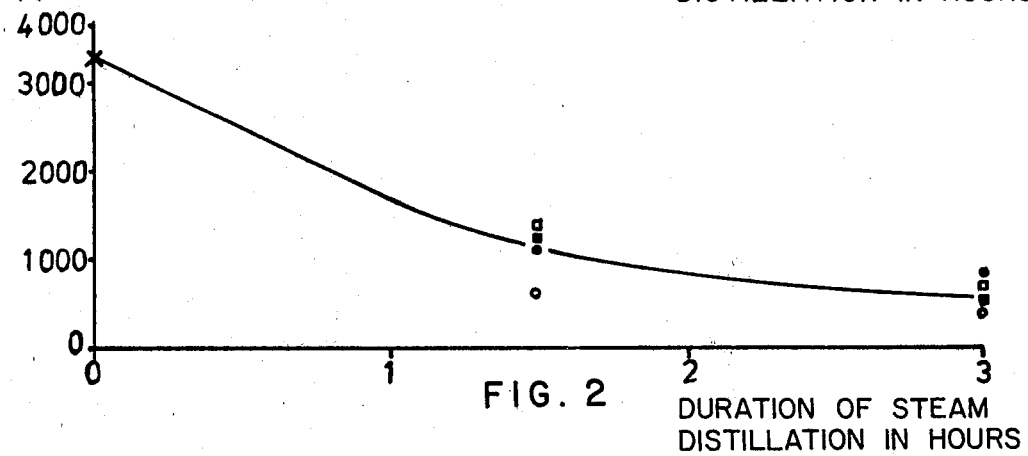
FIG. 2 — DURATION OF STEAM DISTILLATION IN HOURS

PROCESS FOR THE REMOVAL OF RESIDUAL MONOMERS FROM ABS POLYMERS

This application is a continuation of application Ser. No. 127,742 filed Mar. 6, 1980, now abandoned.

ABS polymers are essentially elastic-thermoplastic products synthesized mainly from the monomers, acrylonitrile (A), butadiene (B; also substituted by other rubbers) and styrene or α-methylstyrene (S) (see also C. H. Basdekis, ABS plastics, Reinhold Publishing Corporation, New York, 1964).

In none of the technical processes employed for the production of ABS are the monomers completely reacted. The quantity of unreacted monomers depends on the polymerisation process and the polymerisation conditions employed. The unreacted monomers (residual monomers) must be removed from the polymer. The methods required for this also depend on the polymerisation process (for example emulsion, suspension or solvent-free polymerisation) and on the required residual monomer content.

The present invention relates to removing residual monomers from ABS polymers which have been prepared by emulsion polymerisation with a monomer conversion of over 92%. These ABS polymers are thus primarily obtained as aqueous emulsions or latices.

Unreacted monomers can be removed from solutions or aqueous emulsions of polymers by steam distillation:

Steam is passed through the solution or emulsion, or the solution or emulsion is simply heated if it contains enough water. A mixture of water and residual monomers then distills off. In emulsions the monomers are only removed from the continuous aqueous phase by this method.

Those residual monomers which are mainly contained in the polymer must therefore first diffuse into the water. The smaller the polymer particles and the higher the temperature, the faster is this diffusion. The rate of diffusion of the monomer from the polymer into water then determines the efficiency of steam distillation.

The present invention relates to a process for the removal of residual monomers from ABS polymers which have been prepared by emulsion polymerisation, wherein an electrolyte, e.g. an acid or a salt is added to a latex containing an ABS polymer, the quantity added being from 0.1 to 10%, by weight, based on the solids content of the latex, and at the same time the mixture is heated to a temperature of from 55° to 120° C. to remove residual monomer and part of the water by distillation. The two steps of addition of electrolyte and heating are known, but what is essential to the present invention is that the electrolyte is added simultaneously with or even prior to heating (which has the effect of a steam distillation) so that the latex first coagulates into larger particles and water and residual monomer are removed subsequently. The residual monomers are effectively removed by this method, although this is not to be expected. Coagulation converts the latex into a form in which the particles are larger and no longer uniformly and stably distributed in the aqueous medium. One would therefore expect the residual monomers to diffuse more slowly into water and the purification operation to become ineffective. Surprisingly, the contrary is true. One advantage of this method of removing monomers is, of course, that once the latex has coagulated, no attention need be paid to its stability and the tendency to foaming is also reduced.

The process may be applied to the conventional, well known ABS emulsion polymers. These products are, generally, polymer mixtures of one or more graft polymers and one or more thermoplastic resins. The graft polymers are, as a rule, obtained by the polymerisation of resin-foaming monomers in the presence of a rubber latex, at least part of the resin-forming monomer becoming chemically bonded to the rubber in the course of polymerisation. This is referred to as "grafting" or "graft polymerisation." The thermoplastic resins are generally obtained by the polymerisation of resin-forming monomers in aqueous emulsions in the absence of the rubber latex. The term "ABS polymer" is thus used to denote a graft polymer, a mixture of several graft polymers and a mixture of one or more graft polymers with a thermoplastic resin. These mixtures are obtained either by preparation of a mixture of the latices and joint precipitation or by separate precipitation of the latices and isolation of the polymers, followed by mechanical mixing.

ABS polymers generally contain from 2 to 35%, by weight, of the rubber used as graft base and they generally comprise 5 to 70%, by weight, of one or more graft polymers and 95 to 30%, by weight, of one or more thermoplastic resins.

Graft bases for the purposes of the present invention are, in particular, rubber latices which have a glass transition temperature $T_g \leq -10°$ C. (according to DIN 53 445) and which are sufficiently reactive for grafting. Rubbers based on 1,3-diene and modified acrylate rubbers are preferred. Chlorobutadiene polymers, butadiene polymers, isoprene polymers (homopolymers and copolymers containing up to 30% by weight, of styrene and/or acrylonitrile) and copolymers of butadiene and acrylic acid alkyl esters having an acrylic acid ester content of up to 70% are particularly preferred. The particle size (particle diameter $d_{50}$, i.e. the average diameter such that 50% of the particles have a larger diameter and 50% a smaller diameter) is preferably from 0.05 to 0.8 μm.

The resin-forming monomers include in particular styrene, α-methyl styrene and acrylonitrile. For particular effects, they may be partly or completely replaced by (meth)acrylonitrile, alkyl esters of acrylic acid, alkyl esters of (meth)acrylic acid or halogen derivatives of styrene and of α-methyl styrene. Styrene and acrylonitrile in proportions, by weight of from 5:1 to 1:5, particularly from 4:1 to 3:2, are preferred. These resin-forming monomers are polymerised in emulsion by means of radical polymerisation, in the presence of the rubber latex. The end products obtained are graft polymers. These monomers may also be polymerised in the absence of rubber, in which case they give rise to thermoplastic resins. These resins, generally, have molecular weights of from 30,000 to 200,000.

The ABS polymers are initially obtained in the form of a latex, as mentioned above.

It is known to coagulate these latices by the addition of electrolytes.

Suitable coagulating agents are, in particular, readily water-soluble alkali metal and alkaline earth metal salts of organic and inorganic acids, aluminium sulphate, water-soluble organic and inorganic acids and substances which form one of the above-mentioned precipitating agents by hydrolysis. Sodium chloride, magnesium chloride, magnesium sulphate, calcium chloride, aluminium sulphate, hydrochloric acid, sulphuric acid, phosphoric acid, formic acid, acetic acid, propionic acid and salts of these acids are particularly preferred.

The coagulating agent or mixture of various coagulating agents is preferably added in the form of an aqueous solution to the latex which is to be coagulated. The quantity must be sufficient for precipitation and is generally from 10 to 100% of the volume of the latex. The quantity or concentration of the precipitating agent may generally by chosen so that the quantity of polymer to be precipitated amounts to from 7.5 to 35%, by weight, of the total quantity. The particle size and particle size distribution of the coagulate depend on the precipitating conditions, i.e. the temperature of the latex to be coagulated, the temperature of the precipitating agent and the method employed for mixing. Coagulation is generally carried out for from 0.5 to 6 hours, preferably from 1 to 3 hours, at from 90° to 100° C. Shorter times are sufficient at higher temperatures.

The coagulate is then heated in the conventional manner. The temperature required depends on the pressure in the system, i.e. distillation may be carried out at normal pressure or excess pressure or under vacuum. Heat may be supplied by heating the vessel or by injecting steam.

EXAMPLES

Preparation and characterization of the ABS and SAN emulsion polymers.

1. Graft base (G)

The graft bases are prepared by emulsion polymerisation in pressure reactors. The polymerisation temperature varies from 55° C. to 75° C. (starting temperature→final temperature). Water, butadiene, n-dodecylmercaptan and potassium peroxidisulphate are introduced into the reaction vessel at the beginning of the reaction. When using the following substances:

|  | Graft base G-1 Parts, by weight | Graft base G-2 Parts, by weight |
| --- | --- | --- |
| Deionized water | 68 | 200 |
| Sodium salt of disproportionated abietic acid |  |  |
| Total quantity | 2.0 | 5.0 |
| quantity provided at onset of polymerisation | 0.5 | 5.0 |
| quantity subsequently added in the course of polymerisation | 1.5 | — |
| n/1 NaOH | 2.0 | 5.0 |
| Potassium peroxidisulphate | 0.5 | 0.3 |
| Butadiene | 100 | 100 |
| n-dodecylmercaptan | 0.4 | 0.4 |

Polymerisation is carried out until conversion is greater than 95%. Unreacted butadiene is removed from the latex by degasing.

When they have been processed, the polymers have a gel content of ≧85% (determined in methyl ethyl ketone or toluene). The graft base "G-1" has an average particle size of 0.4 μm and the graft base "G-2" has an average particle size of 0.1 μm (ultracentrifuge measurement; see W. Scholten, H. Lange: Colloid, Z. and Z. Polymere 250 (1972) 782–796).

2. Graft polymers (P)

The latices used as graft bases described under 1 are diluted with deionized water to a polymer concentration of g (cf. Table A) parts by wt. of graft base (solid product)

to 175 parts, by weight, of water.

The water used for diluting the latex contains 0.5 parts, by weight, (based on the graft base+graft monomer) of potassium peroxidisulphate. After the air has been displaced by nitrogen and the reaction mixture has been heated to 65° C., 2 parts, by weight, of the sodium salt of disproportionated abietic acid dissolved in 25 parts, by weight, of deionized water, on the one hand, and the quantities of styrene and acrylonitrile mentioned below, on the other, are added in two separate streams. The time taken for the addition of these substances is 4 hours. At the end of this time, stirring is continued for a further 2 hours to 65° C. to complete the reaction.

|  | Graft polymer P 1 | Graft polymer P 2 |
| --- | --- | --- |
| Graft base | G 1 | G 2 |
| parts, by weight, of graft base (solids content) (g) | 80 | 50 |
| Parts, by weight, of styrene | 17.5 | 35 |
| Parts, by weight, of acrylonitrile | 2.5 | 15 |

3. SAN copolymer

An α-methyl styrene-acrylonitrile (SAN) copolymer is prepared according to U.S. Pat. No. 3,111,501, Example 1, from the following components:

| Parts, by weight, α-methylstyrene | 69 |
| --- | --- |
| Parts, by weight, acrylonitrile | 31 |
| Parts, by weight, dodecylmercaptan | 0.25 |
| Mη (in methyl ethyl ketone at 25° C.) | 90,000 |

4. Latex mixture

A latex mixture is prepared from the following components for removal of residual monomers:

| 12 parts, by weight, graft polymer P 1 |
| --- |
| 15 parts, by weight, graft polymer P 2 |
| 73 parts, by weight, SAN copolymer. |

The latex mixture has a solids content of 33%, by weight.

5. Latex coagulation 1.27 parts, by weight, of an aqueous 2% weight magnesium sulphate solution are provided for coagulating the latex and 1.0 part, by weight, of the latex prepared under 4 (solids content 33%) is added thereto with vigorous stirring. The coagulate is maintained in an easily filtered form as the temperature is raised to above 80° C.

Typical particle size distribution (after drying in a hot air drier):

90% >20 μm
50% >100 μm
10% >500 μm.

6. Monomer determination

Monomer determination was carried out by heat space gas chromatography, using the method of the internal standard. Solvent: Dimethyl formamide. Margin of error: ±5 to 10%.

7. Examples 1 to 4, Monomer removal from latex and coagulate

The latex described under 4 is used for Examples 1 to 4. It is divided into 4 equal parts and then treated as follows:

EXAMPLE 1

The latex is subjected to a distillation with stirring at normal pressure for 3 hours.

| Boiling temperature: | 99–100° C. |
|---|---|
| Rate of distillation: | 2.1% of the reaction volume per hour. |

EXAMPLE 2

The latex is distilled for 3 hours with stirring at a previously produced pressure of from 523 to 525 Torr.

| Boiling temperature: | 89–90° C. |
|---|---|
| Rate of distillation: | 2.4% of the reaction volume per hour. |

EXAMPLE 3

The latex sample is coagulated as under 5 and distilled for 3 hours at normal pressure with stirring.

| Boiling temperature: | 100° C. |
|---|---|
| Rate of distillation: | 3.3% of the reaction volume per hour. |

EXAMPLE 4

The latex sample is coagulated as under 5 and distilled for 3 hours at from 524 to 527 Torr with stirring.

| Boiling temperature: | 90° C. |
|---|---|
| Rate of distillation: | 2.2% of the reaction volume per hour. |

In each of these Examples, the volume of liquid distilled off (water+monomers) was continuously replaced by the addition of water to the reaction volume.

After a distillation time of from 1.5 to 3 hours, samples were removed from the reaction vessel and analysed for acrylonitrile and styrene content.

A uniform system of references was chosen so that the monomer contents in the latex and coagulate treatment could be compared quantitatively: the total quantity of monomer present in the reaction volume was based on the quantity of polymer in the reaction volume.

From an analytical point of view, a latex is a homogeneous one-phase system, while the aqueous coagulate dispersion is a heterogeneous two-phase system. This means that for determination of the monomers in the coagulate treatment, the aqueous phase and the polymer phase which may be removed by filtration must be analysed separately. The analytical data obtained in Examples 1 to 4 are summarized in Tables 1 and 2 below. Table 3 below gives the relevant figures for a comparison between the processes of latex treatment and coagulate treatment. They are calculated from Tables 1 and 2, as follows:

Latex:

$$\text{Monomer content based on polymer substance} = \frac{\text{Monomer content in the latex}}{0.33}$$

Coagulate:

$$\begin{array}{l}\text{Monomer content} \\ \text{based on polymer} \\ \text{substance}\end{array} = \begin{array}{l}\text{Monomer} \\ \text{content} \\ \text{in the} \\ \text{polymer} \\ \text{phase}\end{array} + \frac{1.27 + 0.67}{0.33} \times \begin{array}{l}\text{Monomer} \\ \text{content} \\ \text{in the} \\ \text{aqueous} \\ \text{phase}\end{array}$$

$$\begin{array}{l}\text{Monomer} \\ \text{content} \\ \text{in polymer} \\ \text{phase}\end{array} = \frac{\begin{array}{l}\text{Monomer} \\ \text{content} \\ \text{in polymer} \\ \text{moist} \\ \text{with} \\ \text{water}\end{array} - \begin{array}{l}\text{Water} \\ \text{content} \\ \text{in polymer} \\ \text{moist} \\ \text{with} \\ \text{water}\end{array} \times \begin{array}{l}\text{Monomer} \\ \text{content} \\ \text{in} \times 10^{-2} \\ \text{aqueous} \\ \text{phase}\end{array}}{1 - \begin{array}{l}\text{water content in} \\ \text{polymer moist with} \times 10^{-2} \\ \text{water}\end{array}}$$

FIG. 1 and FIG. 2 are graphs representing the numerical values of Table 3.

The graphs show that removal of the monomers at the coagulate stage is just as effective as degassing in the latex stage although the polymer particles in the coagulate stage are many times larger than those in the latex stage.

| Legend to FIG. 1 and FIG. 2 | | |
|---|---|---|
| X | Starting latex | |
| ○ | Coagulate, | 100° C., Example 3 |
| ■ | Latex, | 100° C., Example 1 |
| O | Coagulate, | 90° C., Example 4 |
| □ | Latex, | 90° C., Example 2 |

TABLE 1

Analytical examination of latices

| | After a distillation time in hours | Distillation Temperature °C. | Acrylonitrile content (ppm) | Styrene Content (ppm) |
|---|---|---|---|---|
| Starting Latex | 0 | — | 3,000 | 1,100 |
| Example 1 | 1.5 | 100 | 145 | 480 |
| Example 2 | 3 | 100 | 30 | 170 |
| Example 2 | 1.5 | 90 | 88 | 431 |
| Example 2 | 3 | 90 | 17 | 233 |

TABLE 2

Analytical investigation of coagulates

| | After a distillation time in hours | Distillation Temperature °C. | Acrylonitrile content in polymer moist with water (ppm) | Acrylonitrile content in aqueous phase (ppm) | Styrene Content in polymer moist with water (ppm) | Styrene Content in aqueous phase (ppm) | Water content in polymer moist with water (%) |
|---|---|---|---|---|---|---|---|
| Example 3 | 1.5 | 100 | 92 | 10 | 860 | 10 | 22 |
| Example 3 | 3 | 100 | 56 | 6 | 550 | 12 | 23 |
| Example 4 | 1.5 | 90 | 101 | 34 | 404 | 15 | 24 |
| Example 4 | 3 | 90 | 20 | 18 | 265 | 15 | 21 |

TABLE 3

Monomer content based on polymer substance

| | Distillation time (h) | Temperature (°C.) | Latex or coagulate | Acrylonitrile (ppm) | Styrene (ppm) |
|---|---|---|---|---|---|
| Starting latex | 0 | | | 9,000 | 3,300 |
| Example 1 | 1.5 | 100 | latex | 435 | 1,440 |
| Example 2 | 1.5 | 90 | latex | 264 | 1,300 |
| Example 3 | 1.5 | 100 | coagulate | 173 | 1,160 |
| Example 4 | 1.5 | 90 | coagulate | 320 | 620 |
| Example 1 | 3 | 100 | latex | 90 | 510 |
| Example 2 | 3 | 90 | latex | 51 | 700 |
| Example 3 | 3 | 100 | coagulate | 106 | 780 |
| Example 4 | 3 | 90 | coagulate | 125 | 418 |

We claim:

1. Process for recovering ABS polymers from a latex prepared by emulsion polymerization with simultaneous removal of residual monomers, which consisting essentially of:
   (a) adding to the latex 0.1 to 10% by weight, based on the solids content, of an electrolyte selected from acids and salts,
   (b) simultaneously heating the mixture to about 55° to 120° C. to cause coagulation, and
   (c) then distilling off part of the water, together with the residual monomers thereby removing residual monomers.

* * * * *